United States Patent [19]

Halasa

[11] 3,993,856

[45] Nov. 23, 1976

[54] PROCESS FOR POLYMERIZING BUTADIENE

[75] Inventor: Adel Farhan Halasa, Bath, Ohio

[73] Assignee: The Firestone Tire & Rubber Company, Akron, Ohio

[22] Filed: May 5, 1975

[21] Appl. No.: 574,793

Related U.S. Application Data

[63] Continuation-in-part of Ser. No. 491,723, July 25, 1974, abandoned.

[52] U.S. Cl. .................................. 526/140; 526/335
[51] Int. Cl.² ...................... C08F 4/26; C08F 4/52
[58] Field of Search ................... 260/94.3; 450/663; 526/140

[56] References Cited
UNITED STATES PATENTS

| | | | |
|---|---|---|---|
| 3,066,127 | 11/1962 | Carlson et al. | 260/94.3 |
| 3,135,725 | 6/1964 | Carlson et al. | 260/94.3 |
| 3,203,945 | 8/1965 | Zelinski | 260/94.3 |
| 3,487,063 | 12/1969 | Throckmorton et al. | 260/94.3 |
| 3,502,637 | 3/1970 | Marullo et al. | 260/94.3 |

OTHER PUBLICATIONS

Wang et al., Chemical Abstrats, vol. 64, 1966, 2167c.

*Primary Examiner*—Stanford M. Levin

[57] ABSTRACT

1,3-Butadiene is polymerized in the liquid phase in the presence of a catalyst composition comprising:
  a. A cobalt-containing component;
  b. A reducing agent comprising $RalX_2$ wherein R is hydrogen or a hydrocarbon radical of 1–8 carbon atoms, and X is halogen; and
  c. $CS_2$ The cobalt-containing component may be a cobalt salt, such as a cobalt halide, carboxylate, thiocarboxylate, carbonate, thiocarbonate, etc. or a complex of such a salt with an oxygen-containing or nitrogen-containing group either in the same compound or in a separate compound. Typical aluminum hydride or hydrocarbon dihalides that may be used are aluminum hydride dichloride, ethyl aluminum dichloride, ethyl aluminum dibromide, etc. With appropriate solvent and temperature, butadiene polymers having at least 90% cis-1,4 microstructure and in many cases 95–99% cis-1,4 are obtained in high yield. These polymers have excellent green strength and windup tack.

26 Claims, No Drawings

PROCESS FOR POLYMERIZING BUTADIENE

This application is a continuation-in-part of application Ser. No. 491,723 filed July 25, 1974, now abandoned.

BACKGROUND OF THE INVENTION

1. Field of the Invention

This invention relates to a process for the preparation in high yield of a polybutadiene having at least 70% cis-1,4 and in many cases more than 95% cis-1,4 microstructure. More specifically this process involves the polymerization of 1,3-butadiene in the presence of a novel catalyst composition.

2. Related Prior Art

U.S. Pat. No. 3,778,424 discloses the preparation of 1,2-polybutadiene which is syndiotactic in character and uses for the polymerization of 1,3-butadiene a catalyst composition comprising (a) a soluble cobalt compound, (b) an $AlR_3$ compound in which R is a hydrocarbon radical of 1–6 carbon atoms, and (c) $CS_2$. The soluble cobalt compound is defined as including, among various other compounds, (1) a cobalt salt of an organic carboxylic acid of at least 6 carbon atoms, such as cobalt octoate and cobalt naphthenate and (2) a complex of a cobalt halide, such as $CoCl_2$, with "a tertiary amine, e.g. pyridine, triethylamine, tributylamine and dimethylaniline, . . . ; and an N,N-dialkylamide, e.g., N,N-dimethyl formamide, N,N-dimethyl acetamide and N,N-diethyl formamide." The products described are highly syndiotactic-1,2.

SUMMARY OF THE INVENTION

In accordance with the present invention it has been found that the use of a monohydrocarbon aluminum dihalide as the reducing agent, in place of the aluminum trihydrocarbon of the above patent, results in the production of an entirely different microstructure in the polymer, namely a predominance of cis-1,4, and with an aromatic solvent and a temperature range of 10°–40° F substantially complete conversion to 95–99% cis-1,4 may be effected. This has been found to be highly desirable because of the resultant excellent green strength and windup tack in these polymers.

The catalyst composition used in this polymerization comprises:
a. a cobalt-containing component which may be a cobalt salt or a complex of a cobalt salt with an oxygen-containing or nitrogen-containing group, either in the same compound or in a separate compound;
b. a reducing agent having the formula $RAlX_2$ wherein R is hydrogen or a hydrocarbon radical of 1–8 carbon atoms, and X is halogen; and
c. $CS_2$.

In this catalyst composition the proportion of Co to monomer is in the range of 0.01–1.0, preferably 0.02–0.1 millimoles of Co compound per 100 gms of monomer; the ratio of Al/Co is 10–800, preferably 100–600 moles of Al compound per mole of Co compound; the ratio of $CS_2$/Co is similar to the Al/Co ratio, namely 10–800, preferably 100–600 moles of $CS_2$ per mole of Co. While lower Al/Co ratios may be used than those specified above the product has a lower molecular weight.

Contrary to the above-mentioned patent, the cobalt compound does not need to be soluble in the reaction medium and may merely be suspended in the medium. Therefore the limitations placed on the cobalt compounds to insure solubility do not apply in the present invention. Polymerization may be conducted by solution or suspension of the cobalt component in aromatic hydrocarbons, such as benzene, toluene, xylene, etc., and also in aliphatic hydrocarbons, such as hexane, heptane, octane, decane, cyclohexane, cycloheptane, etc. However, when an aliphatic solvent is used the cis content may be reduced to 90% or less, and with a mixture of 50% aliphatic and 50% aromatic solvent, the cis content may be reduced to 94% or less. Aromatic solvents, such as toluene, benzene and xylene, give cis contents of 98% or higher and are therefore preferred.

A polymerization temperature of 0° to 100° F (−18° to 38° C) is advantageously used, preferably 10° to 40° F (−12° to 5° C). With high temperatures in the range of 0°–100° F the cis content in the product gradually drops off to where it is 80% or less at a polymerization temperature of 100° F. At a polymerization temperature of 0° F there is an induction period and the polymerization takes longer for completion. In the preferred temperature range of 10°–40° F, the cis content may be 98% or higher when an aromatic solvent is used as explained above. Under preferred conditions substantially complete conversion to polymer may be effected within 2 to 6 hours. In any case a substantial amount of polymer is prepared within a minimum of 30 minutes, although for more practical yields the polymerization should be conducted for at least 1 hour.

Typical of the cobalt salts that may be used in the catalyst system of this invention are both cobaltous and cobaltic salts such as the halide, carboxylates, thiocarboxylates, carbonates, thiocarbonates, etc., e.g. $CoCl_2$, $CoCl_3$, $CoBr_2$, $CoBr_3$, $CoI_2$, $CoI_3$, $CoF_2$, $CoF_3$, Co carbonate, Co diacetate, $CoCO_3$, Co diformate, Co dipropionate, Co dihexoate, Co dioctoate, Co dinaphthenate, Co thiocarbonate, Co bis (dithioacetate), Co bis (dithiocarbamate), Co bis (mercaptobenzothiazole), etc.

Also useful are salts of carboxylic and thiocarboxylic acids which also contain keto or thioketo or nitrogen groups therein with which the cobalt may be complexed in addition to being attached as a salt component. These are referred to herein as salt-complexes. Typical nitrogen groups that may be present for such complexing purposes are: primary, secondary or tertiary amino groups, i.e. $-NH_2$, $-NH-$ or $>N-$ respectively; the aldimino group, $-CH=NR'$, the ketimino group, $>C=NR'$; the nitro group, $-NO_2$; and the nitroso group, $-N=O$, etc., wherein R' is hydrogen or a hydrocarbon group as defined above for R. Furthermore, also contrary to the above patent, a complexing nitrogen does not need to be in the form of a tertiary amine, but may be also in the form of secondary and primary amines as well as in the form of other nitrogen groups as listed above provided they meet the other limitations or requirements of this invention.

Preferred among the salt-complex formers are the aminoacids such as:
picolinic acid, $C_5H_{10}N(COOH)$;
glycine, $NH_2CH_2COOH$;
alanine, $CH_3CH(NH_2)COOH$;
aminobutyric acid, $CH_3CH_2CH(NH_2)COOH$;
threonine, $CH_3, CH(OH)CH(CH_2)COOH$;
norvaline, $CH_3CH_2CH_2CH(NH_2)COOH$;
valine, $(CH_3)_2CHCH(NH_2)COOH$;
methionine, $CH_3SCH_2CH_2CH(NH_2)COOH$;
laucine, $(CH_3)_2CHCH_2CH(NH_2)COOH$;

aspartic acid,

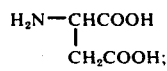

N,N-dimethyldithiocarbomic acid, $(CH_3)_2NCSSH$;
N-acetylanthanilic acid, o-$CH_3CONHC_6H_4COOH$;
mercaptobenzothiazole,

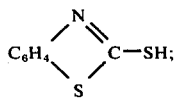

hippuric acid, $C_6H_5CONHCH_2COOH$;
glutamic acid,

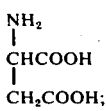

lysine, $NH_2(CH_2)_4CH(NH_2)COOH$;
1,2-diaminopropionic acid, $NH_2CH_2CH(NH_2)COOH$;
aminopimelic acid, $HOOC(CH_2)_4CH(NH_2)COOH$;
betaaminovaleric acid, $CH_2CH_2CH(NH_2)CH_2COOH$;
2,6-diamino-4-hydroxy-caproic acid, $NH_2CH_2CH(OH)CHCH_2CH(NH_2)COOH$;
hydroxyethyl glycine, $HOCH_2CH_2NHCH_2COOH$;
aminoethyl glycine, $NH_2CH_2CH_2NHCH_2COOH$;
iminodiacetic acid, $NN(CH_2COOH)$;
iminodipropionic acid, $HN(CH_2CH_2COOH)_2$;
aminoethyliminoacetic acid, $H_2NCH_2CH_2N(CH_2COOH)_2$;
hydroxyethyliminediacetic acid, $NOCH_2CH_2N(CH_2COOH)_2$;
hydroxypropyliminodiacetic acid, $HO(CH_2)_3N(CH_2COOH)_2$;
as well as 3-aminotyrosine, canavanine, 3-4-di-hydroxylphenylalanine, ethonine, ethonine sulfone, citrulline, creatine, cysteic acid, cystine, dibromothyronine, glycocyanine, histidine, homocystine, hydroxyproline, methylhistidine, pennicillamine, pyroglutamic acid, thienylalanine, carboxymethyl aspartic acid, etc.

Amino acids preferred in the practice of this invention are the aliphatic aminoacids having no more than about 20 carbon atoms therein, and preferably having an amino group separated from a carboxylic group by no more than 2 carbon atoms. The aminoacids and their derivatives can have a plurality of amino and carboxylic groups therein and also can contain other functional groups therein which do not interfere with and in some cases even may enhance, the complexing or chelating tendencies of the compound.

Generally the salt is formed which has two acid groups attached to one cobalt atom and the cobalt is furthermore complexed or chelated with the nitrogen.

It is also advantageous, particularly where it is desired to have the cobalt component in solution, to use complexing agents in which the keto, thioketo or nitrogen-containing group is in a separate compound. Suitable compounds for this purpose include beta-diketones of the formula

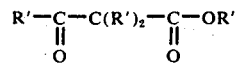

wherein R' is as defined above. Typical examples of these are acetylacetone and ethyl acetoacetate which form complexes with cobalt salts.

Nitrogen-containing compounds are those which contain the various nitrogen-containing groups listed above for the salt-complex formers. In addition to the various compounds listed above, other complex formers are tertiary phosphines, such as triphenyl phosphine, tributyl phosphine, etc., N,N-dialkylamides, such as N,N-dimethylacetamide, N,N-dimethylformamide, N,N-diethylformamide, etc., alcohols, such as methanol, ethanol, propanol, ethylene glycol, etc. Particularly preferred complexing agents for this purpose are compounds containing nitrogen and oxygen or sulfur, preferably with no more than 2 carbon atoms separating the nitrogen from the oxygen or sulfur. Typical of these are: N-methylpyrrolidone, caprolactam, pyrrolidone, o,m or p-aminoacetophenone, o,m or p-aminobenzophenone, N-methyl-aminoacetophenone, N,N-dimethyl-aminoacetophenone, N-methyl-aminobenzophenone, 2-aminocyclohexanone, 4-aminocyclohexanone, N-methyl-2-aminocyclohexanone, N,N-dimethylcyclohexanone, etc., and the corresponding thioketo compounds, such as N-Me-thiopyrrolidone, thiocaprolactam, amino-thioacetophenone, etc.

When a separate compound is used to form a cobalt complex for the catalyst composition of this invention, such complex former may be used in a proportion of 1–30 moles per mole of cobalt compound, preferably 1–16 moles when a pyrrolidone is used and 1–6 moles when a lactam is used. In the carboxylates and thiocarboxylates used herein, it is generally not necessary to have more than 20 carbon atoms in such compounds.

The reducing agents that may be used in the practice of this invention comprise monohydrocarbon aluminum dihalides and aluminum hydride dihalides. Alkyl groups of 1–8 carbon atoms are preferred in the above compounds but even larger hydrocarbon groups or aromatic or cycloaliphatic hydrocarbon groups such as decyl, dodecyl, phenyl, tolyl, xylyl, diphenyl, naphthyl, cyclohexyl, cycloheptyl, etc., may also be present in place of the alkyl group in the respective compounds. Moreover while the chlorides are preferred as the halide group, the corresponding bromides, iodides and fluorides may also be used.

Typical aluminum dihalides that may be used include: methyl aluminum dichloride, ethyl aluminum dichloride, propyl aluminum dichloride, butyl aluminum dichloride, amyl aluminum dibromide, hexyl aluminum diiodide, octyl aluminum difluoride, methyl aluminum diiodide, ethyl aluminum dibromide, hexyl aluminum dibromide, propyl aluminum diiodide, phenyl aluminum dichloride, cyclohexyl aluminum dichloride, tolyl aluminum dichloride, naphthyl aluminum dichloride, cycloheptyl aluminum dibromide, aluminum hydride dichloride, aluminum hydride dibromide, aluminum hydride diiodide, aluminum hydride difluoride, and the like.

The catalyst combination is preferably prepared in the solution of butadiene and solvent or suspension medium. The order of addition of components is not critical although a preferred embodiment involves the addition of the reducing agent as the last component.

No other particular conditions are required for the polymerization of this invention except that an inert atmosphere, such as nitrogen and an inert solvent medium should be used. The pressure may be atmospheric or superatmospheric. The polymerization can be performed either batchwise or continuously, using known apparatus. The polymer can be easily isolated by inactivating and eliminating the catalyst by treatment with alcohols, etc.

The polymers obtained by the process of this invention have excellent green strength, windup tack, wear resistance and good mechanical properties, such as impact strength, etc. Such products are useful for the production of films, fibers and other shaped articles, such as tires, belts, shoe soles and heels, etc.

A typical polymer of this invention having 98% cis-1,4 is compared in green strength with a high cis-1,4 (at least 90%) polybutadiene used commercially for making tires with the following results:

|  | Initial (psi) | Peak (psi) | At Break (psi) | Elongation At Break(%) |
|---|---|---|---|---|
| New polymer | 50 | 195 | 195 | 380 |
| Commercial polymer | 10 | 10 | 5 | 475 |

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight.

EXAMPLE I

A polymerization is conducted using a 2-gallon stainless steel reactor equipped with stirrer, inlet and outlet means, and cooling system for maintaining the desired temperature. The reactor is dried and flushed out with dry nitrogen. A dried blend of butadiene and toluene (1.20 lbs. or 545 gms. of butadiene and 10.8 lbs. of toluene) is introduced into the reactor at 66° F (22 psi). Then there is added 2.75 millimole of a $CoCl_2$ complex in toluene comprising 16 moles of N-methylpyrrolidone per mole of $CoCl_2$. The cobalt chloride complex is soluble in toluene and gives a blue color. Then 275 millimoles of $CS_2$ in 300 ml. of toluene is added, followed by 550 millimoles of ethyl aluminum dichloride diluted with toluene. The Al/Co ratio is 200/1 and the $CS_2$/Co ratio is 100/1. The temperature rises initially to 87° F but is cooled to and maintained at 52°–61° F with the pressure no higher than 50 psi. Samples are taken periodically to determine percent conversion. Each sample, as well as the final product has 0% gel. At the end of 3 hrs. 45 minutes the conversion is 100% to a product having 97.4% cis-1,4. This product is dropped into 2 gallons of isopropanol containing 1% of antioxidant. The precipitated product is drum dried and upon testing is found to have a glass transition temperature ($T_g$) of −107° C, a melting point ($T_m$) of −18° C, and a Mooney ($ML_4$ at 212° F) of 150. The William Plasticity test at 73° F gives the values:

| 3 Minute Reading | 1 Minute Reading | Recovery Value |
|---|---|---|
| 4.10 mm. | 6.31 mm. | 2.21 mm. |

The various samples and final product have the following analyses:

| Conversion | 20% | 30% | 60% | 80% | 100% |
|---|---|---|---|---|---|
| Cis-1,4(%) | 98.9 | 98.5 | 98.0 | 97.5 | 97.4 |
| Trans(%) | 0.5 | 0.9 | 1.20 | 1.5 | 1.6 |
| 1,2(%) | 0.6 | 0.6 | 0.80 | 1.0 | 1.0 |
| DSV | 2.40 | 2.50 | 3.4 | 3.8 | 4.6 |

EXAMPLE II

The procedure of Example I is repeated except that the temperature is initially 10° F and is repeated except that the temperature is initially 10° F and is thereafter maintained below 40° F except for a brief period at a maximum of 55° F; the reactor is pressurized to 50 psig with nitrogen; and the catalyst proportions and procedure of addition are as follows: 2.73 millimoles of $CoCl_2·16NMP$ and 273 millimoles of $CS_2$ are added ($CS_2$/Co = 100/1) and stirred for 10 minutes before 273 millimoles of $EtAlCl_2$ is added (Al/Co = 100/1). At the end of about 6 hours of reaction the conversion is 100% and the product is dropped into isopropanol and precipitated. The cis-1,4 content is 98.1%. The Williams Plasticity values at 73° F are

| 3 Minute Reading | 1 Minute Reading | Recovery Value |
|---|---|---|
| 7.95 mm. | 11.55 mm. | 3.60 mm. |

The polymer product has a $T_g$ of −108° C and a $T_m$ of −6° C.

EXAMPLE III

The procedure of Example II is repeated except that the $CoCl_2·16$ NMP and $CS_2$ are mixed first in a 28 ounce bottle, toluene added, then the entire mixture is added to the reactor and 10 minutes later 266.4 millimoles (instead of 273) of $EtAlCl_2$ is added. Also, the temperature is maintained below 36° F for the first 2.5 hours and then allowed to rise to 60°–65° F during the last hour. When conversion is completed at the end of 4.5 hours, the product is precipitated in isopropanol containing antioxidant. The product has a Mooney viscosity of 39.7 and the Williams Plasticity values at 73° F are

| 3 Minute Reading | 1 Minute Reading | Recovery Value |
|---|---|---|
| 3.9 mm. | 6.20 mm. | 2.26 mm. |

The various samples and final product have the following analyses:

| Conversion | 10% | 40% | 60% | 80% | 100% |
|---|---|---|---|---|---|
| Cis-1,4(%) | 98.9 | 98.7 | 98.0 | 97.5 | 97 |
| Trans-1,4(%) | 0.6 | 0.7 | 1.0 | 1.3 | 1.8 |
| 1,2(%) | 0.5 | 0.6 | 1.0 | 1.2 | 1.2 |
| DSV | 2.34 | 2.64 | 3.0 | 4.3 | 4.15 |
| Gel | 0.0 | 0.0 | 0.0 | 0.0 | 0.0 |
| $ML_4$ at 212° F. | — | — | — | — | 149 |

EXAMPLE IIIA

The procedure of Example III is repeated using a blend of 5% butadiene and 95% toluene with a total of 100 gms. of butadiene being used together with 0.25 millimoles of $CoCl_2·16NMP$, 75 millimoles of $EtAlCl_2$, 37.5 millimoles of CS₂ and a temperature of 15°–30° F. Samples for analysis are removed at 10%, 40%, 60 % and 100% conversion. The various samples and final product have the following analyses:

| Conversion | 10% | 40% | 60% | 100% |
|---|---|---|---|---|
| Cis-1,4(%) | 98.5 | 98.5 | 98.4 | 98.0 |
| Trans-1,4(%) | 0.8 | 0.7 | 0.8 | 1.1 |
| 1,2(%) | 0.8 | 0.7 | 0.8 | 0.9 |
| DSV | 3.23 | 3.28 | 3.48 | 3.52 |
| Gel | 14.1 | 3.5 | 7.5 | 2.7 |
| ML₄ at 212° F. | — | — | — | 129.0 |
| Williams Recovery Value (mm.) | — | — | — | 3.4 |

EXAMPLE IV

The procedure of Example I is repeated four times using isobutyl aluminum dichloride as the aluminum compound and cobalt dipicolinate as the cobalt component in the following varying amounts with the temperature maintained at 5°–30° F.:

| Millimoles | | | Molar Ratio | |
|---|---|---|---|---|
| Co | BuAlCl₂ | CS₂ | Al/Co | CS₂/Co |
| 2.00 | 400 | 200 | 200/1 | 100/1 |
| 2.25 | 450 | 225 | 200/1 | 100/1 |
| 2.50 | 500 | 250 | 200/1 | 100/1 |
| 2.75 | 550 | 275 | 200/1 | 100/1 |

In each case the conversion is over 85% and the product has over 95% cis-1,4 microstructure.

EXAMPLE V

The procedure of Example IV is repeated with satisfactory results using an equivalent amount of Co bis(-benzothiazoline-2-thiolate) as the cobalt component.

EXAMPLE VI

The procedure of Example I is repeated a number of times with satisfactory results using in place of the dibutyl aluminum chloride equivalent amounts respectively of:
a. Isopropyl aluminum dichloride
b. Isobutyl aluminum dibromide
c. Isopropyl aluminum diiodide
d. Isobutyl aluminum dichloride
e. Hexyl aluminum difluoride
f. Phenyl aluminum dichloride
g. Cyclohexyl aluminum dichloride

EXAMPLE VII

The procedure of Example IV is repeated a number of times with satisfactory results using as the cobalt component equivalent amounts respectively of the following complexes:
a. CoCl₂·6 caprolactam
b. CoCl₂·16 pyrrolidone
c. CoCl₂·10 p-aminoacetophenone
d. CoCl₂·10 N-methyl-thiopyrrolidone
e. CoCl₂·6 thiocaprolactam
f. CoCl₂·2 acetylacetone
g. CoCl₂·2 acetoacetate

EXAMPLE VIII

The procedure of Example IV is repeated a number of times with satisfactory results using as the cobalt component 2.5 millimoles of the following together with Al/Co ratios of 400/1 and CS₂/Co ratios of 400/1:
a. Co dihippurate
b. Co bis(N-acetyl-anthranilate)
c. Co bis(N,N-dimethyldithiocarbamate)
d. Co diglycinate
e. Co dialaninate
f. Anhydrous cobaltous chloride
g. Cobaltous carbonate
h. Cobaltous diacetate
i. Cobaltous bis(dithioacetate)
j. Cobaltous dioctoate
k. Cobaltous dinaphthoate
l. Cobaltous dithiocarbonate

EXAMPLE IX

The procedure of Example IV is repeated a number of times with similar results using as the Co component equivalent amounts respectively of:
a. CoCl₃
b. Co(OOCCH₃)₂
c. Co(OOCC₆H₅)₂
d. CoBr₂
e. CoCO₃
f. Co(SSCCH₃)₂

EXAMPLE X

The procedure of Example II is repeated twice with similar results using equivalent amounts respectively of aluminum hydride dichloride and aluminum hydride dibromide. These are prepared by prereacting one part of AlH₃ with two parts of aluminum trihalide.

It appears that the polymerization temperature is an important factor in controlling the molecular weight and cis-1,4 content. However for a particular temperature, the catalyst concentration has an influence on the molecular weight, the molecular weight increasing to some extent with decreasing amounts of catalyst. This indicates that the polymerization is a living type of polymerization.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims.

The invention claimed is:
1. A process for the preparation of polybutadiene high in cis-1,4 microstructure which comprises polymerizing 1,3-butadiene in the liquid phase in the presence of a catalyst composition consisting essentially of:
  a. a cobalt-containing component selected from the class consisting of cobalt halides, carboxylates, thiocarboxylates, carbonate, thiocarbonate and complexes of said halides, carboxylates, thiocarboxylates, carbonate and thiocarbonate, said complex being formed between the cobalt and a nitrogen, keto or thioketo group in the same compound or with a separate cyclic compound having both a nitrogen and keto or thioketo group therein;
  b. a reducing agent having the formula RAlX₂ wherein R is hydrogen or a hydrocarbon radical of 1-8 carbon atoms, and X is halogen; and c. $CS_2$.

2. The process of claim 1 in which said cobalt-containing component is a cobalt compound complex of a cyclic compound having an amino nitrogen and a keto or thioketo group therein.

3. The process of claim 2 in which said complex is one of cobaltous chloride and N-methyl-pyrrolidone.

4. The process of claim 2 in which said complex is one of cobaltous chloride and caprolactam.

5. The process of claim 2 in which 1–30 moles of cyclic compound is used per mole of Co compound; said cobalt compound is used in a proportion of 0.1–1 millimoles per 100 grams of butadiene; the proportion of reducing agents is 10–800 moles of Al compound per mole of Co compound; and the proportion of $CS_2$ is 10–800 moles per mole of Co compound.

6. The process of claim 5 in which said reducing agent is an alkyl aluminum dichloride.

7. The process of claim 6 in which said reducing agent is an alkyl aluminum dibromide.

8. The process of claim 6 in which said complex former is N-methylpyrrolidone and is used in a proportion of 1–16 moles per mole of Co salt.

9. The process of claim 8 in which said cobalt compound is cobaltous chloride.

10. The process of claim 5 in which said complex former is caprolactam and is used in a proportion of 1–6 moles per mole of Co salt.

11. The process of claim 10 in which said cobalt compound is cobaltous chloride.

12. The process of claim 2 in which 1–16 moles of cyclic compound is used per mole of Co compound; said cobalt compound is used in a proportion of 0.02–0.1 millimoles per 100 grams of butadiene; the proportion of reducing agent is 100–600 moles of Al compound per mole of Co compound; and the proportion of $CS_2$ is 100–600 moles per mole of Co compound.

13. The process of claim 5 in which said reducing agent is an alkyl aluminum dichloride, said cyclic compound is N-methyl-pyrrolidone used in a proportion of 1–16 moles per mole of Co compound, said cobalt compound is cobaltous chloride, the proportion of said reducing agent is 100–600 moles per mole of cobalt compound, and the proportion of $CS_2$ is 100–600 moles per mole of cobalt compound.

14. The process of claim 5 in which said reducing agent is an alkyl aluminum dichloride, said cyclic compound is caprolactam used in a proportion of 1–6 moles of caprolactam per mole of Co compound, said cobalt compound is cobaltous chloride, the proportion of said reducing agent is 100–600 moles per mole of Co compound, and the proportion of $CS_2$ is 100–600 moles per mole of Co compound.

15. The process of claim 1 in which said cobalt component is Co dipicolinate.

16. The process of claim 1 in which said cobalt component is Co dihippurate.

17. The process of claim 1 in which said cobalt component is Co bis(N-acetylanthranilate).

18. The process of claim 1 in which said cobalt component is Co bis(N,N-dimethyldithiocarbamate).

19. The process of claim 1 in which said cobalt component is Co bis(benzothiazolin-2-thiolate).

20. The process of claim 1 in which said reducing agent is butyl aluminum dichloride.

21. The process of claim 5 in which the polymerization temperature is 10°–40° F.

22. The process of claim 9 in which the polymerization temperature is 10°–40° F.

23. The process of claim 11 in which the polymerization temperature is 10°–40° F.

24. The process of claim 13 in which the polymerization temperature is 10°–40° F.

25. The process of claim 1 in which the polymerization temperature is 0°–100° F.

26. The process of claim 1 in which the polymerization temperature is 10°–40° F.

* * * * *

UNITED STATES PATENT OFFICE
CERTIFICATE OF CORRECTION

Patent No. 3,993,856     Dated November 23, 1976

Inventor(s)     Adel Farhan Halasa

It is certified that error appears in the above-identified patent and that said Letters Patent are hereby corrected as shown below:

In line 4 of the Abstract, "RalX$_2$" should read --RAlX$_2$--.

In Column 3, Line 8, "N-acetylanthanilic" should read --N-acetylanthranilic--.

In Column 6, Line 15, delete "and is repeated except".

In Column 6, Line 16, delete "that the temperature is initially 10°F".

Signed and Sealed this

First Day of March 1977

[SEAL]

Attest:

RUTH C. MASON
Attesting Officer

C. MARSHALL DANN
Commissioner of Patents and Trademarks